(12) United States Patent
Knoedgen et al.

(10) Patent No.: US 10,075,121 B2
(45) Date of Patent: Sep. 11, 2018

(54) PWM ACTUATOR CONTROL WITH PULSE REGULATION

(71) Applicant: Dialog Semiconductor (UK) Limited, London (GB)

(72) Inventors: Horst Knoedgen, Munich (DE); Gary Hague, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/191,809

(22) Filed: Jun. 24, 2016

(65) Prior Publication Data

US 2016/0380564 A1 Dec. 29, 2016

(30) Foreign Application Priority Data

Jun. 26, 2015 (DE) .................. 10 2015 211 943

(51) Int. Cl.
*H02P 7/00* (2016.01)
*H02P 7/32* (2006.01)
*H02P 27/08* (2006.01)
*H02H 7/08* (2006.01)

(52) U.S. Cl.
CPC ........... *H02P 27/08* (2013.01); *H02H 7/0833* (2013.01)

(58) Field of Classification Search
None
See application file for complete search history.

(56) References Cited

U.S. PATENT DOCUMENTS

| 3,629,677 A | * | 12/1971 | Means | ................. | H02H 7/0833 |
| | | | | | 318/141 |
| 3,967,173 A | * | 6/1976 | Stich | ....................... | H02P 27/08 |
| | | | | | 318/811 |
| 5,708,578 A | * | 1/1998 | Stoddard | .................. | H02P 6/15 |
| | | | | | 363/95 |

FOREIGN PATENT DOCUMENTS

| DE | 102009003977 | 7/2010 |
| DE | 102012112841 | 6/2014 |

OTHER PUBLICATIONS

German Office Action, File No. 10 2015 211 943.2, Applicant: Dialog Semiconductor (UK) Limited, dated Mar. 9, 2016, 5 pgs, and English language translation, 5 pgs.

* cited by examiner

*Primary Examiner* — Bentsu Ro
*Assistant Examiner* — Zemenay Truneh
(74) *Attorney, Agent, or Firm* — Saile Ackerman LLC; Stephen B. Ackerman

(57) ABSTRACT

A driver circuit for generating a sequence of pulses of a drive voltage from a supply voltage is described. The drive voltage is used for operating an electrical actuator, such as an electrical engine or machine. The driver circuit comprises means for providing an amplitude indication of an amplitude of the supply voltage, which is used for generating a first pulse of the sequence of pulses. Furthermore, the driver circuit comprises an integration unit configured to integrate the amplitude indication for a duration of the first pulse, thereby generating an integrated voltage. In addition, the driver circuit comprises a comparator configured to compare the integrated voltage with a reference voltage, thereby generating a comparator signal. Furthermore, the driver circuit comprises a control unit configured to terminate the first pulse in dependence of the comparator signal.

22 Claims, 4 Drawing Sheets

PWM ACTUATOR CONTROL WITH PULSE REGULATION

TECHNICAL FIELD

The present document relates to the control of an actuator, such as an electrical engine or machine. In particular, the present document relates to the control of such an actuator using pulses.

BACKGROUND

If an electrical engine (also referred to as a motor or machine) is driven with current and voltage pulses as drive signals, wherein the pulses are derived from a power supply, noise on the power supply may cause modulation of the drive signals. The modulation of a drive signal for an engine typically leads to a modulation of the motion of the engine.

SUMMARY

The present document addresses the technical problem of providing an efficient driver circuit for an actuator, which is configured to derive drive signals (notably drive voltages) from a noisy supply, which allow for a stable operation of the actuator. According to an aspect, a driver circuit for generating a sequence of pulses of a drive voltage from a supply voltage is described. The drive voltage may be used for operating an electrical actuator (e.g. an electrical engine or machine). The supply voltage may exhibit variations (e.g. due to noise). The driver circuit may be configured to generate a sequence of pulses, with pulses having a constant energy, even in the presence of variations of the supply voltage. By doing this, a stable operation of the actuator may be ensured, even if the supply voltage exhibits variations.

The driver circuit comprises means for providing an amplitude indication of an amplitude of the supply voltage. In particular, an amplitude indication may be provided for the amplitude of the temporal portion of the supply voltage, which is used for generating a first pulse of the sequence of pulses. The means for providing an amplitude indication may be configured to convert a voltage drop across the actuator into a current. The voltage drop across the actuator typically corresponds to (e.g. is equal to) the amplitude of the first pulse. The conversion may be performed such that the current is proportional to the voltage drop across the actuator (and therefore proportional to the amplitude of the first pulse). In such a case, the amplitude indication may correspond to such a current.

The driver circuit may further comprise an integration unit which is configured to integrate the amplitude indication for a duration of the first pulse, thereby generating an integrated voltage. The integration unit may start cumulating the amplitude indication at the beginning of the first pulse. Furthermore, the integration unit may terminate the accumulation of the amplitude indication, when the first pulse is terminated. As such, the integrated voltage is typically indicative of the amplitude-times-duration product of the first pulse, which is indicative of the energy of the first pulse.

The integration unit may comprise a capacitor (for cumulating the amplitude indication). Furthermore, the integration unit may comprise a reset switch which is arranged in parallel to the capacitor and which is configured to discharge the capacitor, subsequent to the termination of the first pulse. The reset switch may be controlled by the control unit of the driver circuit. By using the reset switch, the integration unit may be reset in preparation for a pulse that is subsequent to the first pulse.

In addition, the driver circuit comprises a comparator which is configured to compare the integrated voltage with a reference voltage, thereby generating a comparator signal. The reference voltage may be indicative of a target energy which is to be provided to the actuator using the first pulse. As such, the comparator may be configured to determine whether the cumulated amplitude indication (i.e. the integrated voltage) corresponds to the target energy or not.

The comparator may be configured to set the comparator signal at a time instant at which the integrated voltage becomes equal to the reference voltage. In other words, the comparator signal may be set as soon as the integrated voltage becomes equal to the reference voltage. As such, a time instant may be detected at which the energy of the first pulse corresponds to the target energy.

The driver circuit may comprise a control unit which is configured to terminate the first pulse in dependence of the comparator signal. In particular, the control unit may be configured to terminate the first pulse as soon as the comparator signal is set, i.e. as soon as the comparator determines that the energy of the first pulse corresponds to the target energy.

Hence, the driver circuit may be configured to generate a sequence of pulses having pulses which exhibit a pre-determined target energy, thereby enabling a stable operation of the actuator. This may be achieved even through the supply voltage exhibits variations.

The driver circuit may comprise a control switch which is configured to couple the actuator with the supply voltage. The control unit may be configured to generate a control signal for controlling the control switch, in dependence of the comparator signal. In particular, the control unit may be configured to generate a first control signal for opening the control switch, thereby terminating the first pulse. The first control signal may be generated in dependence of the comparator signal (as outlined above). Furthermore, the control unit may be configured to generate a second control signal for closing the control switch, thereby starting or initiating the generation of a pulse of the sequence of pulses. The second control signal may be generated in dependence of a pulse trigger signal (or clock signal), wherein the pulse trigger signal comprises triggers at a trigger frequency (or clock frequency), wherein the trigger frequency may be fixed.

As such, the drive circuit may be configured to provide a sequence of pulses at a trigger frequency, wherein the duration (or width) of the pulses may be varied, in order to ensure that the pulses exhibit a pre-determined target energy (even in case of a varying supply voltage).

The control unit may comprise a (or may correspond to a) gated D latch with a reset interface, a clock interface and an output interface. The comparator signal may be coupled to the reset interface, the pulse trigger signal may be coupled to the clock interface and/or the first pulse may be terminated using a control signal provided at the output interface. In particular, the first and/or second control signal may be provided at the output interface. As such, the control unit may be implemented in an efficient manner.

The means for providing an amplitude indication may comprise a resistor which is arranged between the actuator and the integration unit. In such a case, the amplitude indication may correspond to a current through the resistor. Alternatively, the means for providing an amplitude indication may comprise a current source which is controlled in dependence on a voltage drop across the actuator. In such a case, the amplitude indication may correspond to a current provided by the current source.

The driver circuit may comprise calibration means configured to calibrate the integration unit. By doing this, the accuracy of the driver circuit may be increased.

The driver circuit may comprise a full bridge with a plurality of control switches. The control unit may be configured to control the plurality of control switches using a control signal, in order to generate from the supply voltage pulses with reverse polarity for the sequence of pulses. By providing a full bridge, the actuator may be operated in an increased number of operation modes (e.g. in a forward and a reverse operation mode).

According to a further aspect, a method for generating a sequence of pulses from a supply voltage is described. The sequence of pulses is used for operating an electrical actuator. The method comprises providing an amplitude indication of an amplitude of the supply voltage, which is used for generating a first pulse of the sequence of pulses. Furthermore, the method comprises integrating the amplitude indication for a duration of the first pulse, thereby generating an integrated voltage. In addition, the method comprises comparing the integrated voltage with a reference voltage, thereby generating a comparator signal. The method comprises further terminating the first pulse in dependence of the comparator signal.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As indicated above, the present document is directed at the stable operation of an actuator (e.g. an electrical engine) using a noisy power supply. The power supply may e.g. provide voltages in the range of 5V or 10V. In particular, the present document is directed at providing an efficient driver circuit for such an actuator.

Figure 1:
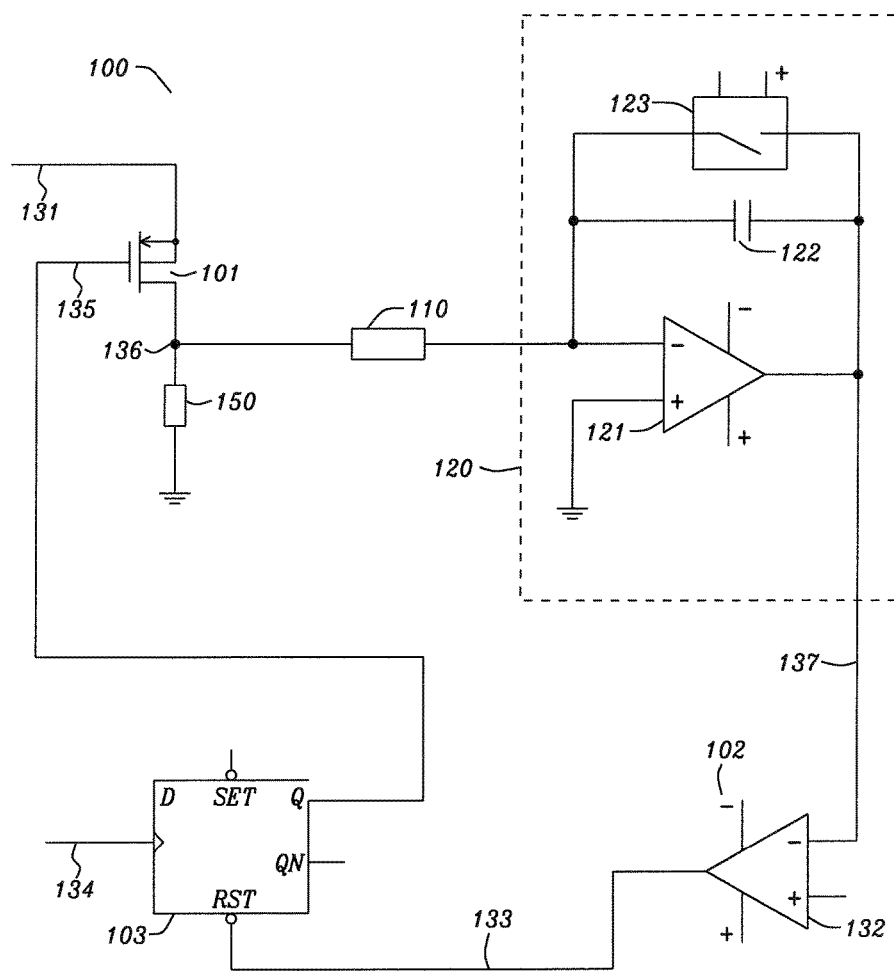
FIG. 1 shows a block diagram of an example driver circuit.

FIG. 1 shows a block diagram of an example driver circuit 100 for an actuator 150. The driver circuit comprises a control switch 101 which is configured to apply a drive voltage 136 to the actuator, wherein the drive voltage 136 is derived from a supply voltage 131. The supply voltage 131 may have a nominal value and may exhibit variations around the nominal value. The drive voltage 136 may comprise a sequence of pulses for operating the actuator 150. The pulses exhibit a temporal length and an amplitude. The power or energy for operating the actuator 150 is typically proportional to the product of the temporal length and the amplitude of a pulse. A stable operation of the actuator 150 may be achieved by operating the actuator 150 with a sequence of pulses, wherein the pulses of the sequence of pulses have constant energy.

The driver circuit 100 is configured to generate a drive voltage 136 with a sequence of pulses having equal energy using an integration unit 120. The integration unit 120 is configured to monitor the integral of the amplitude of a pulse of the drive voltage 136. As such, the integration unit 120 is configured to monitor the energy of a pulse of the drive voltage 136. By doing this, the energy of the pulses may be kept constant, even if the supply voltage 131 is noisy. Variations of the supply voltages 131 may be regulated during the generation of a pulse and by consequence, noise from the supply voltage 131 may be suppressed.

The integration unit 120 is configured to provide an integral voltage 137 which is indicative of the cumulated or integrated amplitude of a pulse of the drive voltage 136. Using a comparator 102, the integral voltage 137 may be compared with a pre-determined reference voltage 132, wherein the reference voltage 132 is indicative of the target energy of a pulse of the drive voltage 136. In other words, the reference voltage 132 may be used to set the target energy of a pulse of the drive voltage 136. Using an digital-to-analog converter, a digital reference signal may be converted into an analog reference voltage 132. As such, a digital reference signal may be used to set the target energy of a pulse of the drive voltage 136. The comparator 102 generates a comparator signal 133 which is set or reset as soon as the integral voltage 137 reaches the reference voltage 132. Hence, the comparator signal 133 indicates the time instant at which a pulse of the drive signal 136 exhibits the target energy.

The driver circuit 100 further comprises a control unit 103 (which comprises e.g. a flip-flop or D latch). The control unit 103 is configured to generate a control signal 135 for the control switch 101 in dependence of the comparator signal 133. In particular, the control unit 103 may be configured to generate a first control signal 135 for opening the control switch 101 (i.e. for terminating a pulse of the drive voltage 136), as soon as the comparator signal 133 indicates that the pulse of the drive signal 136 exhibits the target energy.

Furthermore, the control unit 103 may be configured to generate the second control signal 135 based on a pulse trigger signal 134, wherein the pulse trigger signal indicates that a pulse for the drive voltage 136 is to be generated. The control unit 103 may be configured to generate a second control signal 135 for closing the control switch 101 (i.e. for starting a pulse of the drive voltage 136), in reaction to an appropriate trigger within the pulse trigger signal 134.

As shown in FIG. 1, the integration unit 120 may comprise an operational amplifier 121 and a capacitor 122. Furthermore, a reset switch 123 may be used to discharge the capacitor 122. The capacitor 122 may be discharged subsequent to the termination of a particular pulse and prior to the start of a directly subsequent pulse.

The resistor 110 may be used to sense the amplitude of the drive signal 136. In particular, the resistor 110 may be used to provide a current to the integration unit 120, which is proportional to the voltage drop across the actuator 150, i.e. which is proportional to the amplitude of a pulse of the drive voltage 136.

Using the driver circuit 100, the engine 150 may be started by setting the flip flop (i.e. the D latch) 103, thereby closing the control switch 101 and thereby starting the generation of a pulse for the drive voltage 136. The integration unit 120 starts to integrate the amplitude of the pulse. The integration time, until the time instant when the reference voltage 132 is reached, depends on the amplitude of the drive voltage 136 across the actuator 150. As soon as the reference voltage 132 is reached, the flip flop 103 is reset and the integration unit 120 zeroed (using the reset switch 123). The process restarts at the next clock pulse or trigger (provided by the pulse trigger signal 134). Supply voltages 132 with a relatively high amplitude lead to relatively low integration times, which results in relatively short pulses, thereby maintaining the voltage-time product constant. The energy of a pulse for driving the actuator 150 is proportional to the reference voltage 132. Consequently, the reference voltage 132 may be adjusted to set the desired energy level for each pulse of the drive voltage 136.

Using the driver circuit 100 of FIG. 1, the influence of supply voltage variations or noise on the energy which is applied to the actuator 150 may be suppressed.

Figure 2A:
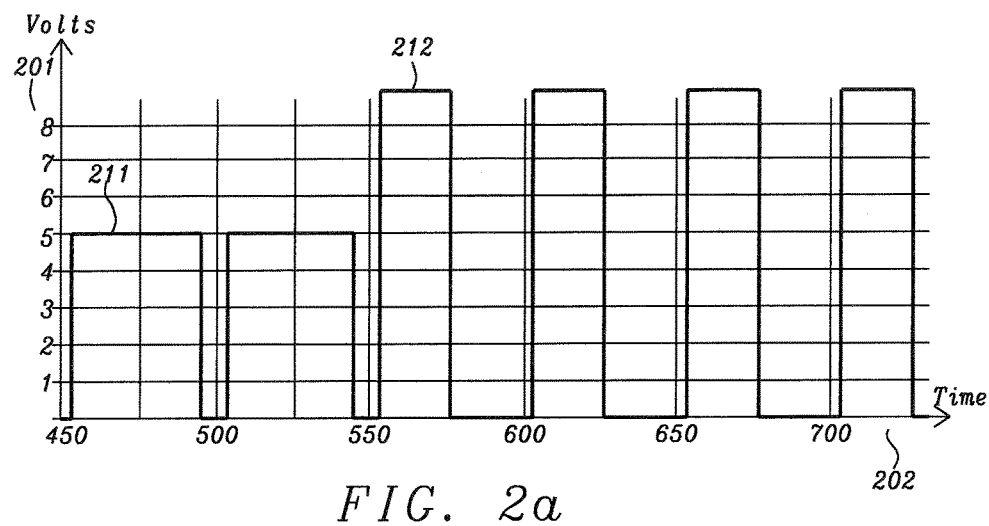
FIGS. 2a and 2b show example drive voltages.
Figure 2B:
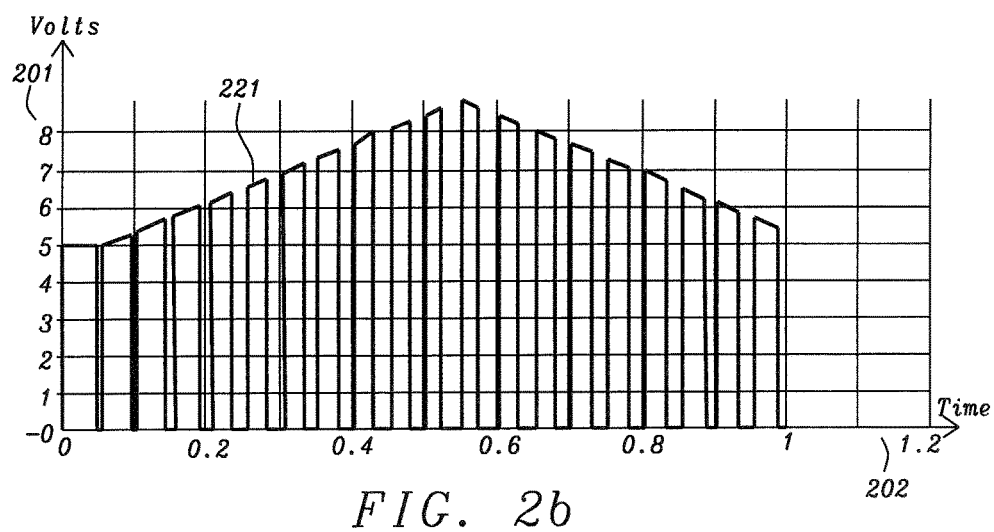

FIGS. 2a and 2b show example pulses of a drive voltage 136. The pulse frequency of the sequence of pulses of a drive voltage 136 may be constant and may be set by the pulse trigger signal 134. FIGS. 2a and 2b show the amplitude 201 (measured in Volts) of pulses 211, 212 over time 202 (measured in μs). As can be seen in FIG. a, the temporal length of a pulse 211, 212 increases as the amplitude of the pulse 211, 212 decreases (and vice versa). On the other hand, the amplitude-time product of a pulse 211, 212 (which is indicative of the energy of the pulse) remains constant. FIG. 2b shows a sequence 221 of pulses. It can be seen that as the amplitude 201 of the pulses of the sequence 221 of pulses increases, the temporal length (or duration) of the pulses decreases (and vice versa). Hence, the driver circuit 100 may be used to regulate the pulse width (or duration) of the pulses of the drive voltage 136 in dependence on the amplitude of the voltage pulses which are applied to the actuator 150, i.e. in dependence on the amplitude of the supply voltage 131.

Figure 3:
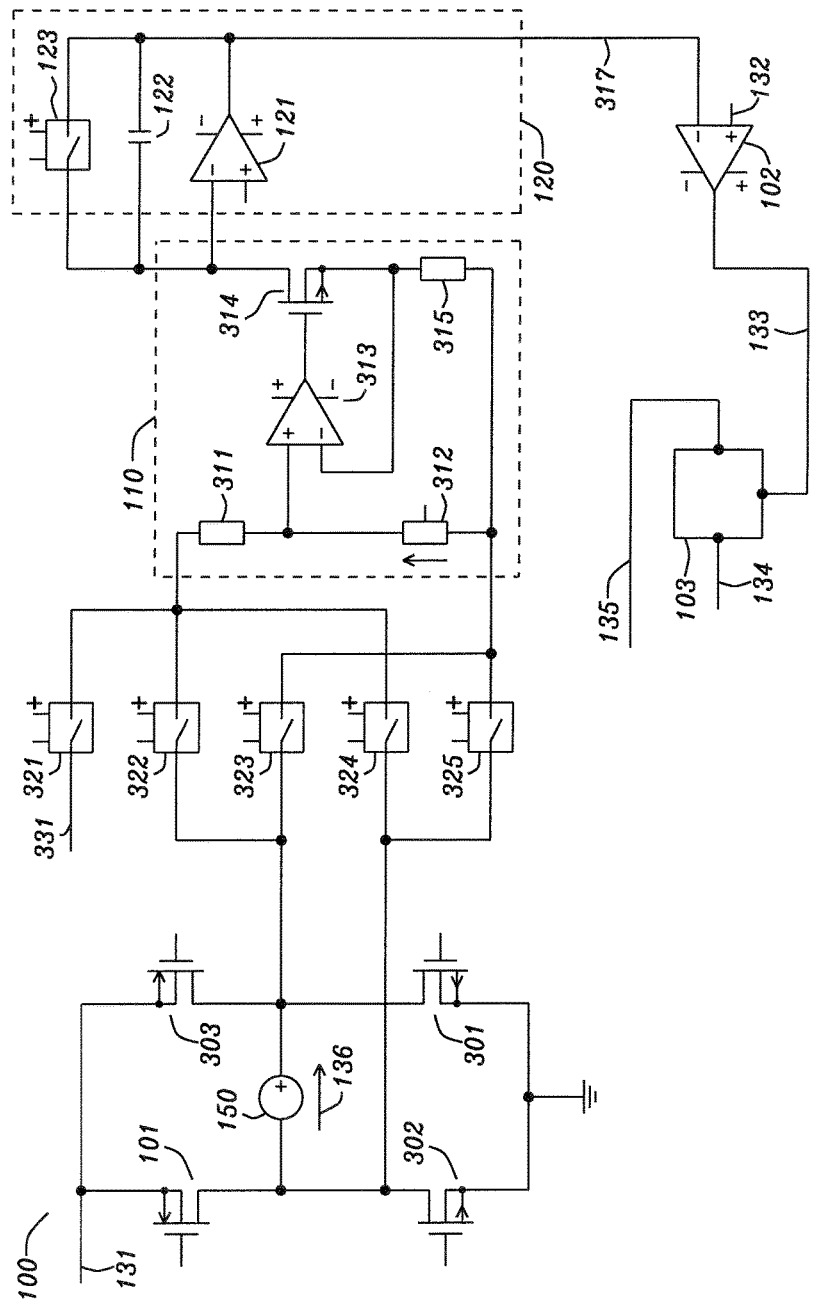
FIG. 3 shows a block diagram of another example driver circuit.

FIG. 3 shows a block diagram of another driver circuit 100. In the illustrated example, a full bridge is used to provide a drive voltage 136 to the actuator 150 with a reversible polarity. Either the control switches 101, 301 may be used to generate the drive voltage 136 (by closing the control switches 101, 301, while leaving the control switches 302, 303 open) with a first polarity, or the control switches 303, 302 may be used to generate the drive voltage 136 (by closing the control switches 303, 302, while leaving the control switches 101, 302 open) with a second polarity (which is reverse to the first polarity). By doing this, the actuator 150 may e.g. be operated in a forward and in a reverse direction, respectively.

Furthermore, the driver circuit 100 comprises a switch network with switches 322, 323, 324, 325 for coupling the actuator 150 with a sensing unit 110 (which may comprise a voltage-current converter). When using the first polarity, the switches 322 and 325 may be closed. On the other hand, when using the second polarity, the switches 323 and 324 may be closed. By using the switch network, the subsequent sensing unit 110 may be limited to a single polarity.

The sensing unit 110 may be used to sense the amplitude of the drive voltage 136 and to provide an amplitude indication (e.g. a current) which is indicative of the amplitude of the drive voltage 136. In the illustrated example, the sensing unit 110 comprises a voltage divider (with the resistors 311, 312), as well as an operational amplifier 313 for controlling the sensing transistor 314 (or current source) which is arranged in series with a sensing resistor 315). The resistor 312 may be a variable and/or controllable resistor.

Furthermore, the driver circuit 100 comprises a calibration switch 321 for coupling the input of the integration unit 120 with a calibration signal 331. By doing this, systematical errors (notably of the integration unit 120) may be removed.

The control signal 135 which is generated by the control unit 103 may be used to control the control switches 101, 301 and/or 302, 303.

As such a full bridge (comprising the control switches 101, 301, 302, 303) may be used to drive the actuator 150 using two polarities. The switching network (comprising the switches 322, 323, 324, 325) may be used as a rectifier in front of the sensing unit 110 (or voltage/current converter) so that the input to the sensing unit 110 corresponds to the voltage across the actuator 150. As a result of this, the sensing unit 110 may be limited to processing only a single polarity.

The example sensing unit 110 comprises a resistor divider 311, 312 for attenuating the drive voltage 136 across the actuator 150. The attenuated voltage is applied across the sensing resistor 315 to develop a current which is proportional to the amplitude of the drive voltage 136. This current may then be integrated by the integration unit 120 to provide an integrated voltage 137 at the output of the integration unit 120, which is proportional to the amplitude of the drive voltage 136 times the width or duration of the corresponding pulse of the drive voltage 136.

An alternative to integrating an amplitude indication of the amplitude of the drive voltage 136 is to directly integrate the amplitude of the supply voltage 131. In such a case, an offset for the voltage drop across the one or more control switches 101, 301 should be taken into account when setting the reference voltage 132.

By using the calibration switch 321 a calibration input may be provided, which allows errors within the integration unit 120 to be calibrated. The time constant of the integrator 120 is typically depend on the values of the resistor 315 or 110 and of the capacitor 122. Furthermore, there may be mismatch and offset errors.

The additional input for calibration may be used to generate from a pre-determined voltage a time constant which is related to the reference clock (i.e. to the pulse trigger signal 134) of the driver circuit 100. By adjusting the time constant, the driver system 100 may be stabilized for different processes and temperatures.

Figure 4:
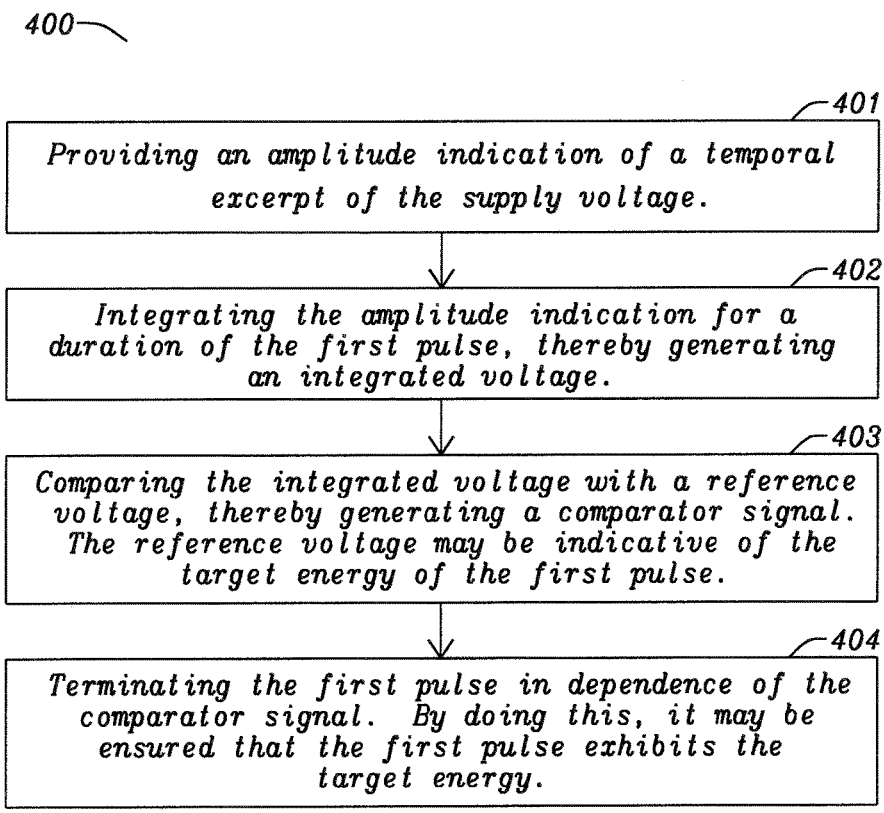
FIG. 4 shows a flow chart of an example method for generating a drive voltage for operating an actuator.

FIG. 4 shows a flow chart of an example method 400 for generating a sequence 221 of pulses 211, 212 of a drive voltage 136 from a supply voltage 131. The drive voltage 136 is used for operating an electrical actuator 150 (e.g. an electrical machine). The method 400 comprises providing 401 an amplitude indication of an amplitude of a temporal excerpt of the supply voltage 131, which is used for generating a first pulse 211 of the sequence 221 of pulses 211, 212. For this purpose, the amplitude indication of the supply voltage 131 may be derived directly from the supply voltage 131. Alternatively or in addition, the amplitude indication may be derived from the drive voltage 136. In particular, the amplitude indication may be derived from the first pulse itself.

Furthermore, the method 400 comprises integrating 402 the amplitude indication for a duration of the first pulse 211, thereby generating an integrated voltage 137. The integration operation may start directly at the beginning of the first pulse 211, and may be continued until the first pulse 211 is terminated. As such, the integrated voltage 137 may correspond to or may be proportional to the accumulation of the amplitude indication since the beginning of the first pulse 211.

The method 400 may proceed in comparing 403 the integrated voltage 137 with a reference voltage 132, thereby generating a comparator signal 133. The reference voltage 132 may be indicative of the target energy of the first pulse 211. The method 400 further comprises terminating 404 the first pulse 211 in dependence of the comparator signal 133. By doing this, it may be ensured that the first pulse 211 exhibits the target energy.

As such, the driver circuits 100 described in the present document allow for a suppression of supply noise for a pulse driven actuator 150. The compensation of the noise is performed directly at the actuator 150, thereby compensating all possible errors. The measurement of the noise may be performed directly at the actuator 150, thereby avoiding possible intermodulation with the on-resistance of the one or more control switches 101, 301 of the driver circuit 100. Using a calibration input, the time constant of the integration unit 120 of the driver circuit 100 may be calibrated. Furthermore, a temperature drift may be calibrated by a calibration channel. In addition, the pulse energy of a voltage pulse may be adjusted by modifying the reference voltage 132 on a pulse-by-pulse basis.

The driver circuits 100 do not require an additional regulator (e.g. a buck, boost or LDO regulator) for generating a noise-free drive voltage 136 from a noisy supply voltage 131, thereby providing a power- and cost-efficient driver circuit 100 for an electrical actuator 150. Using the described driver circuits 100, noise on the supply voltage 131 (e.g. audio noise) does not cause current to flow into the coil of an actuator 150. As such relatively simple digital driving of an actuator 150 may be provided.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A driver circuit for generating a sequence of pulses of a drive voltage from a supply voltage, wherein the drive voltage is used for operating an electrical actuator, wherein the driver circuit comprises,
    a sensing unit for providing an amplitude indication of an amplitude of the supply voltage, which is used for generating a first pulse of the sequence of pulses; wherein the sensing unit for providing an amplitude indication comprises a resistor which is arranged between the actuator and an integration unit; and wherein the amplitude indication corresponds to a current through the resistor;
    the integration unit configured to integrate the amplitude indication for a duration of the first pulse, thereby generating an integrated voltage;
    a comparator configured to compare the integrated voltage with a reference voltage, thereby generating a comparator signal; wherein the reference voltage is indicative of a target energy which is to be provided to the actuator using the first pulse; and
    a control unit configured to
    terminate the first pulse in dependence of the comparator signal; and
    initiate the generating of a pulse of the sequence of pulses in dependence of a pulse trigger signal; wherein the pulse trigger signal comprises triggers at a trigger frequency.

2. The driver circuit of claim 1, wherein
    the driver circuit comprises a control switch which is configured to couple the actuator with the supply voltage; and
    the control unit is configured to generate a control signal for controlling the control switch, in dependence of the comparator signal.

3. The driver circuit of claim 2, wherein the control unit is configured to generate a control signal for
    opening the control switch (101), thereby terminating the first pulse; and/or
    closing the control switch, thereby starting the generation of a pulse of the sequence of pulses.

4. The driver circuit of claim 1, wherein
    the sensing unit for providing an amplitude indication is configured to convert a voltage drop across the actuator in a current;
    the current is proportional to the voltage drop across the actuator; and
    the amplitude indication corresponds to the current.

5. The driver circuit of claim 1, wherein
    the sensing unit for providing an amplitude indication comprise a current source which is controlled in dependence on a voltage drop across the actuator; and
    the amplitude indication corresponds to a current provided by the current source.

6. The driver circuit of claim 1, wherein the integration unit comprises
    a capacitor; and
    a reset switch arranged in parallel to the capacitor and configured to discharge the capacitor, subsequent to the termination of the first pulse.

7. The driver circuit of claim 1, wherein the comparator is configured to set the comparator signal at a time instant at which the integrated voltage becomes equal to the reference voltage.

8. The driver circuit of claim 7, wherein the control unit is configured to terminate the first pulse as soon as the comparator signal is set.

9. The driver circuit of claim 8, wherein
    the control unit comprises a gated D latch with a reset interface, a clock interface and an output interface;
    the comparator signal is coupled to the reset interface;
    the pulse trigger signal is coupled to the clock interface; and
    the first pulse is terminated using a control signal provided at the output interface.

10. The driver circuit of claim 1, wherein the driver circuit comprises calibration means configured to calibrate the integration unit.

11. The driver circuit of claim 1, wherein
    the driver circuit comprises a full bridge with a plurality of control switches; and
    the control unit is configured to control the plurality of control switches using a control signal, in order to generate from the supply voltage pulses with reverse polarity for the sequence of pulses.

12. A method for generating a sequence of pulses of a drive voltage from a supply voltage, wherein the drive voltage is used for operating an electrical actuator, the method comprising,
providing an amplitude indication of an amplitude of the supply voltage, which is used for generating a first pulse of the sequence of pulses; wherein the amplitude indication corresponds to a current through a resistor which is arranged between the actuator and an integration unit;
integrating the amplitude indication for a duration of the first pulse using the integration unit, thereby generating an integrated voltage;
comparing the integrated voltage with a reference voltage, thereby generating a comparator signal; wherein the reference voltage is indicative of a target energy which is to be provided to the actuator using the first pulse;
terminating the first pulse in dependence of the comparator signal; and
initiating the generating of a pulse of the sequence of pulses in dependence of a pulse trigger signal; wherein the pulse trigger signal comprises triggers at a trigger frequency.

13. The method of claim 12, further comprising the steps of:
coupling the actuator with the supply voltage by a control switch; and
generating a control signal by the control unit for controlling the control switch, in dependence of the comparator signal.

14. The method of claim 13, further comprising the steps of:
opening the control switch, thereby terminating the first pulse by a control signal from the control unit, and/or
closing the control switch, thereby starting the generation of a pulse of the sequence of pulses by a control signal from the control unit.

15. The method of claim 12, wherein
means for providing an amplitude indication are used to convert a voltage drop across the actuator in a current;
the current is proportional to the voltage drop across the actuator; and
the amplitude indication corresponds to the current.

16. The method of claim 12, wherein
means for providing an amplitude indication comprise a current source which is controlled in dependence on a voltage drop across the actuator; and
the amplitude indication corresponds to a current provided by the current source.

17. The method of claim 12, wherein an integration unit for integrating the amplitude indication comprises
a capacitor; and
a reset switch arranged in parallel to the capacitor to discharge the capacitor, subsequent to the termination of the first pulse.

18. The method of claim 12, wherein a comparator for comparing the integrated voltage with a reference voltage sets the comparator signal at a time instant at which the integrated voltage becomes equal to the reference voltage.

19. The method of claim 18, wherein the first pulse is terminated as soon as the comparator signal is set.

20. The method of claim 17, wherein a driver circuit for generating the sequence of pulses comprises calibration means to calibrate the integration unit.

21. The method of claim 20, wherein
the driver circuit comprises a full bridge with a plurality of control switches; and
the control unit controls the plurality of control switches using a control signal, in order to generate from the supply voltage pulses with reverse polarity for the sequence of pulses.

22. A driver circuit for generating a sequence of pulses of a drive voltage from a supply voltage, wherein the drive voltage is used for operating an electrical actuator, wherein the driver circuit comprises,
a sensing unit for providing an amplitude indication of an amplitude of the supply voltage, which is used for generating a first pulse of the sequence of pulses;
the integration unit configured to integrate the amplitude indication for a duration of the first pulse, thereby generating an integrated voltage;
calibration means configured to calibrate the integration unit;
a comparator configured to compare the integrated voltage with a reference voltage, thereby generating a comparator signal; wherein the reference voltage is indicative of a target energy which is to be provided to the actuator using the first pulse; and
a control unit configured to
terminate the first pulse in dependence of the comparator signal; and
initiate the generating of a pulse of the sequence of pulses in dependence of a pulse trigger signal; wherein the pulse trigger signal comprises triggers at a trigger frequency.

* * * * *